(12) United States Patent
Kim et al.

(10) Patent No.: US 8,035,772 B2
(45) Date of Patent: Oct. 11, 2011

(54) BACKLIGHT UNIT AND LIQUID CRYSTAL DISPLAY DEVICE HAVING THE SAME

(75) Inventors: Byung-ki Kim, Gunpo-si (KR); Eun-joo Jang, Suwon-si (KR); Hae-il Park, Seoul (KR); Jung-eun Lim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 196 days.

(21) Appl. No.: 12/269,174

(22) Filed: Nov. 12, 2008

(65) Prior Publication Data

US 2009/0180055 A1   Jul. 16, 2009

(30) Foreign Application Priority Data

Jan. 15, 2008   (KR) ................. 10-2008-0004431

(51) Int. Cl.
  *G02F 1/13357*   (2006.01)

(52) U.S. Cl. ............... 349/69; 362/97.3; 977/952
(58) Field of Classification Search .............. None
  See application file for complete search history.

(56) References Cited

U.S. PATENT DOCUMENTS

| | | | |
|---|---|---|---|
| 7,819,539 B2 * | 10/2010 | Kim et al. | 362/84 |
| 2007/0263408 A1 * | 11/2007 | Chua | 362/612 |
| 2008/0246388 A1 * | 10/2008 | Cheon et al. | 313/501 |

* cited by examiner

*Primary Examiner* — Sarah Hahm
(74) *Attorney, Agent, or Firm* — Cantor Colburn LLP (57) ABSTRACT

A backlight unit for a liquid crystal display ("LCD") device includes a light emitting diode ("LED") light source and a light conversion layer disposed separate from and above from the LED light source. The light conversion layer includes a semiconductor nano crystal, converts light emitted from the LED light source to white light and provides the white light to a liquid crystal panel of the LCD.

28 Claims, 4 Drawing Sheets

BACKLIGHT UNIT AND LIQUID CRYSTAL DISPLAY DEVICE HAVING THE SAME

This application claims priority to Korean Patent Application No. 10-2008-0004431, filed on Jan. 15, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") device, and more particularly, to a backlight unit for an LCD device which uses a light emitting diode ("LED") as a light source.

2. Description of the Related Art

LCD devices are a type of display device which forms an image by receiving external light instead of using self-emitted light to form the image, as is the case in plasma display panels ("PDPs") and field emission displays ("FEDs"), for example. Thus, the LCD device requires a backlight unit for emitting light at a back surface of the LCD device.

A conventional backlight unit for an LCD device typically uses a cold cathode fluorescent lamp ("CCFL") as a light source. However, when the CCFL is used as a light source, it is difficult to secure uniformity of brightness of light supplied from the CCFL. In addition, color purity deteriorates as a screen size of the LCD device increases. As a result, a backlight unit which uses three color LEDs as a light source has been developed recently. Since the backlight unit using the three color LEDs as the light source produces an improved color purity, as compared to the backlight unit using the CCFL, and the backlight unit which uses the three color LEDs is therefore used in a high quality display device, for example.

However, the backlight unit which uses the three color LEDs as the light source is more costly as compared to the backlight unit which uses the CCFL as the light source. To mitigate this problem, a white LED which emits light by changing a light output from a single color LED chip to a white light has been proposed. However, although using the white LED is not as expensive as using the three color LEDs, a color purity and a color reproducibility is reduced, as compared to a color purity and color reproducibility of an LCD device including the three color LEDs. Accordingly, various attempts for developing a light source which has improved color purity and color reproducibility while maintaining price competitiveness in comparison with other light sources, have been made.

BRIEF SUMMARY OF THE INVENTION

To solve at least the abovementioned shortfalls and/or problems, an exemplary embodiment of the present invention provides a backlight unit for a liquid crystal display ("LCD") device which uses a light emitting diode ("LED") as a light source.

According to an exemplary embodiment of the present invention, a backlight unit for an LCD device includes an LED light source and a light conversion layer. The LCD device includes a liquid crystal panel, and the light conversion layer is disposed separate from the light emitting diode light source between the liquid crystal panel and the light emitting diode light source. The light conversion layer includes a semiconductor nano crystal, and the light conversion layer converts light emitted from the light emitting diode light source to white light and provides the white light to the liquid crystal panel.

A diffusion panel is provided between the light conversion layer and the liquid crystal panel or, alternatively, between the LED light source and the light conversion layer.

The light conversion layer is manufactured by coating the semiconductor nano crystal onto a transparent substrate or, alternatively, by distributing the semiconductor nano crystal in a film type material and distributing the film type material into a transparent composite. Further, the light conversion layer may be manufactured by coating the semiconductor nano crystal onto the diffusion panel.

The light conversion layer comprises a plurality of layers. In this case, the plurality of layers are separated from one another and a blank layer is formed therebetween.

The LED light source may be disposed at a peripheral side of the light conversion layer. In this case, a light guide panel is disposed between the light emitting diode light source and the light conversion layer, and the light guide panel guides the light emitted from the LED light source to the light conversion layer.

The LED light source emits a blue light or, alternatively, an ultraviolet light.

According to an alternative exemplary embodiment of the present invention, an LCD device includes an LED light source, a light conversion layer disposed separate from and above the LED light source, and a liquid crystal panel disposed above the light conversion layer.

The light conversion layer includes a semiconductor nano crystal, the light conversion layer converts light emitted from the LED light source to white light, and the liquid crystal panel forms an image using the white light.

The LCD device may further include a diffusion panel disposed between the light conversion layer and the liquid crystal panel or, alternatively, a diffusion panel disposed between the LED light source and the light conversion layer.

The LED light source may be disposed at a peripheral side of the light conversion layer, and emits a blue light or an ultraviolet light.

The liquid crystal panel includes a liquid crystal layer, and a color filter disposed adjacent to the liquid crystal layer. The color filter receives the white light and forms an image having a predetermined color using the white light.

According to another alternative exemplary embodiment of the present invention, a backlight unit for an LCD device includes an LED light source and a light conversion diffusion layer disposed separate from the LED light source between the liquid crystal panel and the LED light source. The light conversion diffusion layer includes a semiconductor nano crystal, and the light conversion diffusion layer converts light emitted from the LED light source to white light and provides the white light to the liquid crystal panel.

The light conversion diffusion layer is manufactured by distributing the semiconductor nano crystal in a film type material in a transparent composite including a light diffusion material.

The LED light source is disposed at a peripheral side of the light conversion diffusion layer.

The backlight unit may further include a light guide panel disposed between the LED light source and the light conversion diffusion layer, and the light guide panel may guide the light emitted from the LED light source to the light conversion diffusion layer.

The light conversion diffusion layer may include a first layer and a second layer. The first layer has an energy light emission wavelength less than an energy light emission wavelength of the second layer, and the first layer is disposed in the light conversion layer closer to the LED light source than the second layer.

According to yet another alternative exemplary embodiment of the present invention, an LCD device comprises an LED light source, a light conversion diffusion layer disposed separate from and above the LED light source, and a liquid crystal panel disposed above the light conversion diffusion layer. The light conversion diffusion layer includes a semiconductor nano crystal, the light conversion diffusion layer converts light emitted from the LED light source to white light, and the liquid crystal panel forms an image using the white light.

The LED light source may be disposed at a peripheral side of the light conversion diffusion layer and emits a blue light or an ultraviolet light.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 1:
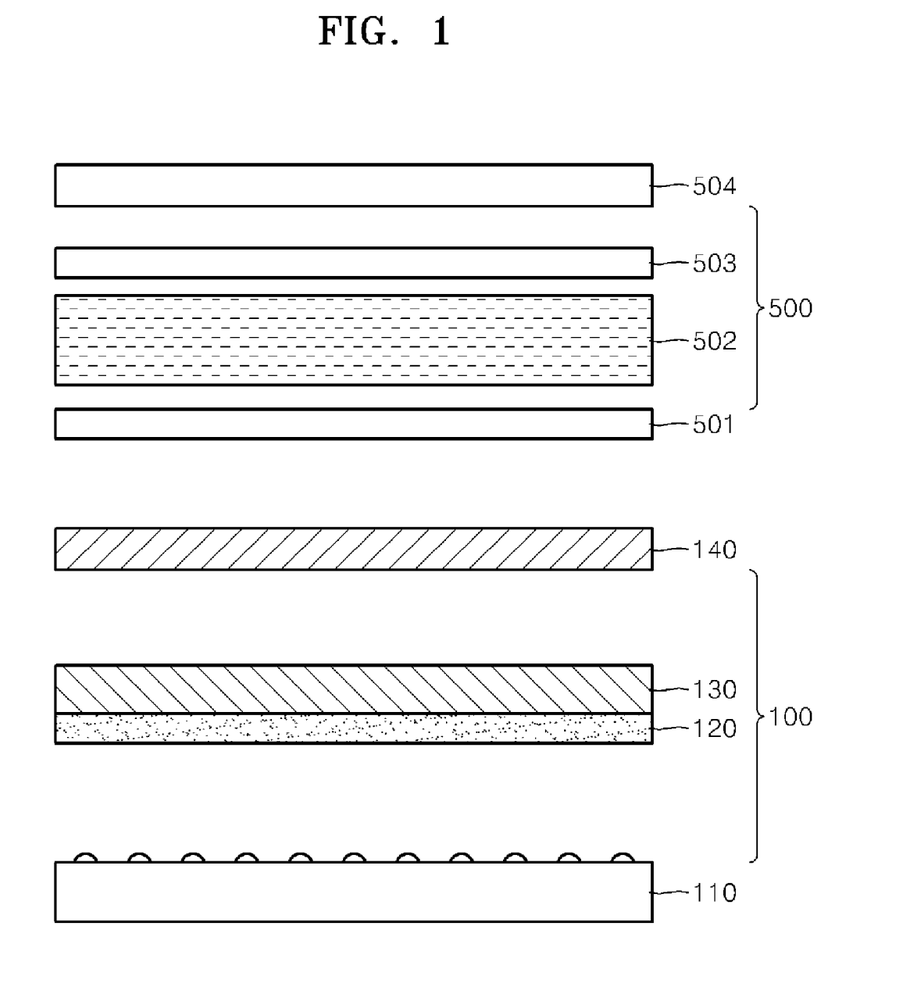
FIG. 1 is a partial cross-sectional view of a liquid crystal display ("LCD") device according to an exemplary embodiment of the present invention.

FIG. 1 is a partial cross-sectional view of a backlight unit according to an exemplary embodiment of the present invention and a liquid crystal display ("LCD") device including the backlight unit. Referring to FIG. 1, an LCD device includes a backlight unit 100 and a liquid crystal panel 500 which displays an image of a predetermined color using white light emitted from the backlight unit 100.

The backlight unit 100 includes a light emitting diode ("LED") light source 110, and a light conversion layer 120 which converts light emitted from the LED light source 110 to white light. The LED light source 110 includes a plurality of LED chips (not shown) which emits light having a predetermined wavelength. In an exemplary embodiment, the LED light source 110 is an LED light source 110 which emits blue light, but alternative exemplary embodiments are not limited thereto. For example, the LED light source 110 according to an alternative exemplary embodiment may be an LED light source 110 which emits an ultraviolet light, for example.

In an exemplary embodiment of the present invention, the light conversion layer 120 is spaced apart from the LED light source 110 by a predetermined distance, and changes, e.g., converts, light emitted from the LED light source 110 to white light and emits the white light toward the liquid crystal panel 500. The light conversion layer 120 is formed of semiconductor nano crystal. As a result, the light conversion layer provides advantages of, but not limited to, substantially improved color reproducibility and color purity.

In an exemplary embodiment of the present invention, the semiconductor nano crystal can be formed of at least one of a group II-VI compound semiconductor material, a group III-V compound semiconductor material or a group IV semiconductor material. Specifically, the group II-VI compound semiconductor material, group III-V compound semiconductor material and group IV semiconductor material includes, for example, HgTe, HgSe, HgS, CdTe, CdSe, Cds, ZnTe, ZnSe, ZnS, GaN, GaP, InN, InP, InAs, Si and Ge, but alternative exemplary embodiments are not limited thereto. Rather, these materials are examples of a material which may be used to form the semiconductor nano crystal. Therefore, various other semiconductor materials may be used for the light conversion layer 120 in alternative exemplary embodiments of the present invention. Further, the light conversion layer 120 may be manufactured by coating the semiconductor nano crystal onto a transparent substrate (not shown) or, alternatively, by distributing a film form in which the semiconductor nano crystal is distributed onto a transparent composite.

In addition, the light conversion layer 120 according to an alternative exemplary embodiment may be formed to include a plurality of layers. In this case, the layers are disposed such that a layer has a light emission wavelength having a lower energy, that is, a longer wavelength, as the layer is located proximate to, e.g., closer to, the LED light source 110. For example, when the LED light source 110 is a blue LED light source, the plurality of layers may have an arrangement structure of the LED light source 110—a red light conversion layer—a green light conversion layer. Also, the plurality of layers forming the light conversion layer 120 may have the following arrangement structure. For example, the plurality of layers may have an arrangement structure of the LED light source 110—a red light conversion layer—a green light conversion layer—a red light conversion layer—a green light conversion layer. Also, the plurality of layers may have another arrangement structure of the LED light source 110—a red light conversion layer—an orange light conversion layer—a yellow light conversion layer—a green light conversion layer. Also, the plurality of layers may have another arrangement structure of the LED light source 110—a red+yellow light conversion layer—a green+orange light conversion layer. The above-described arrangement structures of the plurality of layers forming the light conversion layer 120 are exemplarily described so that, in the present embodiment, a variety of arrangement structures of the plurality of layers forming the light conversion layer 120 may be available in addition to the above-described arrangement structures. Also, when the light conversion layer 120 is formed of a plurality of layers, the plurality of layers may be separated a predetermined distance from one another and a blank layer may be arranged therebetween. Accordingly, as the plurality of layers are separated from one another, energy transfer can be prevented.

When light emitted from the LED light source 110 passes through the light conversion layer 120 formed of the semiconductor nano crystal, white light mixed with blue light, green light and red light is produced. Further, the blue light, the green light and the red light are controlled, e.g., are maintained to have a desired ratio thereof, by changing a composition and/or a size of the semiconductor nano crystal which forms the light conversion layer 120. Accordingly, a white light having substantially improved color reproducibility and color purity is thereby obtained in an exemplary embodiment of the present invention.

Still referring to FIG. 1, an LCD device according to an exemplary embodiment of the present invention further includes a diffusion panel 130 disposed between the light conversion layer 120 and the liquid crystal panel 500. The diffusion panel 130 diffuses and emits the white light output from the light conversion layer 120. Thus, the white light passing through the diffusion panel 130 has a substantially improved uniformity. As shown in FIG. 1, the light conversion layer 120 contacts the diffusion panel 130, e.g., is disposed directly on the diffusion panel 130, but alternative exemplary embodiments of the present invention are not limited thereto. In an alternative exemplary embodiment, for example, the light conversion layer 120 may be separated from the diffusion panel 130, e.g., not disposed directly thereon.

As described above, the light conversion layer 120 may be manufactured by coating the semiconductor nano crystal onto a transparent substrate or, alternatively, by using a film-type material in which the semiconductor nano crystal is distributed in a transparent composite. In yet another alternative exemplary embodiment, the light conversion layer 120 may be manufactured by coating the semiconductor nano crystal onto the diffusion panel 130.

A collimating system 140 is provided between the diffusion panel 130 and the liquid crystal panel 500, as shown in FIG. 1. The collimating system 140 condenses the white light output from the diffusion panel 130 to be supplied to the liquid crystal panel 500.

The white light emitted from the backlight unit 100 including the LED light source 110 and the light conversion layer 120 is supplied to the liquid crystal panel 500 and is therefore incident thereon. Thus, the liquid crystal panel 500 displays an image having a predetermined color with the white light output from the backlight unit 100.

The liquid crystal panel 500 of an LCD device according to an exemplary embodiment includes a first polarized panel 501, a liquid crystal layer 502, a second polarized panel 503 and a color filter 504. In an exemplary embodiment, the first polarized panel 501, the liquid crystal layer 502, the second polarized panel 503 and the color filter 504 are sequentially arranged as illustrated in FIG. 1. As a result, the white light output from the backlight unit 100 passes through the first polarized panel 501, the liquid crystal layer 502, and the second polarized panel 503 and is thereafter incident on the color filter 504, thus forming the image having the predetermined color.

Figure 2:
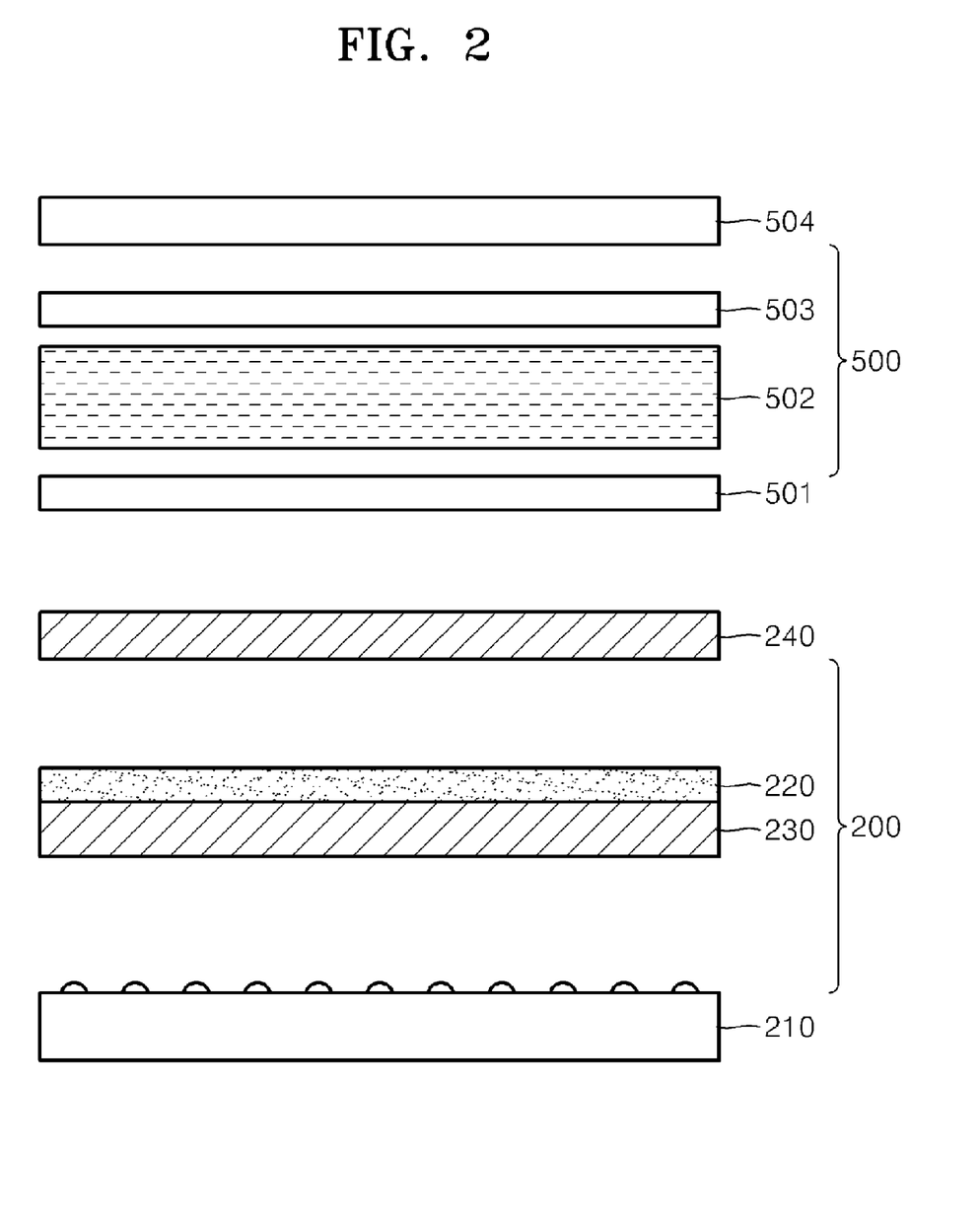
FIG. 2 is a partial cross-sectional view of an LCD device according to an alternative exemplary embodiment of the present invention.

FIG. 2 is a partial cross-sectional view of a backlight unit according to an alternative exemplary embodiment of the present invention and an LCD device including the backlight unit. In FIG. 2, the same reference characters refer to the same or like components of an LCD device described above with respect the exemplary embodiment shown in FIG. 1, and any repetitive detailed description thereof has been omitted. Thus, in the following description, only differences from the above-described exemplary embodiment will be described.

Referring now to FIG. 2, a backlight unit 200 according to an exemplary embodiment includes an LED light source 210 and a light conversion layer 220 disposed separate from the LED light source 210. As described in greater detail above with reference to FIG. 1, the light conversion layer 220 converts light output from the LED light source 210 to white light. Further, the LED light source 210 according to an exemplary embodiment includes an LED light source 210 which emits blue light or, alternatively, an LED light source 210 which emits ultraviolet light. The light conversion layer 220 according to an exemplary embodiment is formed of a semiconductor nano crystal, as described in greater detail above.

The light conversion layer 220 according to an alternative exemplary embodiment may include more than on layer, e.g., may include a plurality of layers. In this case, the plurality of layers may have a variety of arrangement structures as described above. Also, when the light conversion layer 220 has a plurality of layers, the layers may be separated a predetermined distance from one another and a blank layer may be arranged therebetween.

In an exemplary embodiment of the present invention, a diffusion panel 230 is provided between the LED light source 210 and the light conversion layer 220, as shown in FIG. 2. Light passing through the diffusion panel 230 is incident on the light conversion layer 220 and is therein changed to white light. In the exemplary embodiment of the present invention shown in FIG. 2, the diffusion panel 230 contacts the light conversion layer 220, e.g., the diffusion panel 230 is disposed directly on the light conversion layer 220, but alternative exemplary embodiments of the present invention are not limited thereto. For example, the diffusion panel 230 may be separated from the light conversion layer 220 by a predetermined distance.

A collimating system 240 which condenses the white light output toward the liquid crystal panel 500 from the light conversion layer 220 is provided between the light conversion layer 220 and the liquid crystal panel 500. Thus, the liquid crystal panel 500 forms an image having a predetermined color using the white light output from the backlight unit 200, as described in greater detail above.

Figure 3:
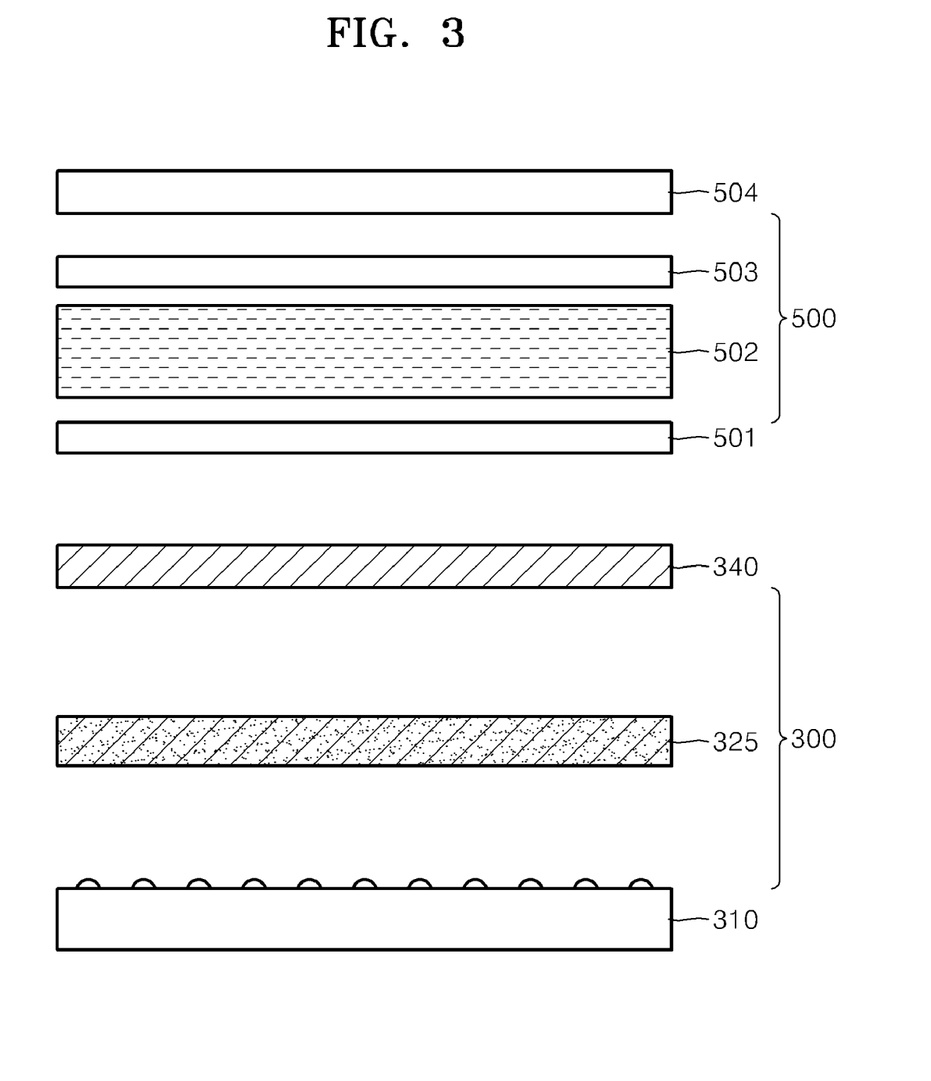
FIG. 3 is a partial cross-sectional view of an LCD device according to another alternative exemplary embodiment of the present invention.

FIG. 3 is a partial cross-sectional view of a backlight unit according to another exemplary embodiment of the present invention and an LCD device including the backlight unit. In FIG. 3, the same reference characters refer to the same or like components of an LCD device described above with respect to the exemplary embodiments shown in FIGS. 1 and 2, and any repetitive detailed description thereof has been omitted. Thus, in the following description, only differences from the above-described exemplary embodiments will be described.

Referring to FIG. 3, a backlight unit 300 according to an exemplary embodiment includes an LED light source 310 and a light conversion diffusion layer 325 disposed separate from the LED light source 310. In an exemplary embodiment of the present invention, the LED light source 310 can is an LED light source 310 which emits blue light or, alternatively, may be an LED light source 310 which emits ultraviolet light, as described above in greater detail with reference to FIG. 1. The light conversion diffusion layer 325 functions as the light conversion layer 120 (FIG. 1) or the light conversion layer 220 (FIG. 2), as well as the diffusion layer 130 (FIG. 1) or the diffusion layer 230 (FIG. 2). Thus, the light conversion diffusion layer 325 diffuses light outputted from the LED light source 310 and also converts the light outputted from the LED light source 310 to white light, and thereafter emits the white light toward the liquid crystal panel 500. The light conversion diffusion layer 325 according to an exemplary embodiment of the present invention includes a semiconductor nano crystal, as described in greater detail above with reference to FIG. 1. In addition, the light conversion diffusion layer 325 may be manufactured as a film type material in which the semiconductor nano crystal is distributed in a transparent composite, including a light diffusion material.

The semiconductor nano crystal according to an exemplary embodiment may be formed of at least one of a group II-VI compound semiconductor material, a group III-V compound semiconductor material, and a group IV semiconductor element. The group II-VI compound semiconductor material, group III-V compound semiconductor material, and group IV semiconductor material include HgTe, HgSe, HgS, CdTe, CdSe, Cds, ZnTe, ZnSe, ZnS, GaN, GaP, InN, InP, InAs, Si, and Ge. It will be noted that alternative exemplary embodiments are not limited to the abovementioned materials. Rather, the abovementioned materials are merely examples of materials which may be used in forming the semiconductor nano crystal, and various other semiconductor materials can be used for the light conversion diffusion layer 325.

In addition, the light conversion diffusion layer 325 according to an exemplary embodiment may be formed to include a plurality of layers. In this case, the layers are disposed such that a layer has a light emission wavelength having a lower energy, that is, a longer wavelength, as the layer is located proximate to, e.g., closer to, the LED light source 310. For example, when the LED light source 310 is a blue LED light source, the plurality of layers may have an arrangement structure of the LED light source 310—a red light conversion layer—a green light conversion layer. Also, the plurality of layers forming the light conversion diffusion layer 325 may have the following arrangement structure. For example, the plurality of layers may have an arrangement structure of the LED light source 310—a red light conversion layer—a green light conversion layer—a red light conversion layer—a green light conversion layer. Also, the plurality of layers may have another arrangement structure of the LED light source 310—a red light conversion layer—an orange light conversion layer—a yellow light conversion layer—a green light conversion layer. Also, the plurality of layers may have another arrangement structure of the LED light source 310—a red+yellow light conversion layer—a green+orange light conversion layer. The above-described arrangement structures of the plurality of layers forming the light conversion diffusion layer 325 are exemplarily described so that, in the present embodiment, a variety of arrangement structures of the plurality of layers forming the light conversion diffusion layer 325 may be available in addition to the above-described arrangement structures. Also, when the light conversion diffusion layer 325 is formed of a plurality of layers, the plurality of layers may be separated a predetermined distance from one another and a blank layer may be arranged therebetween.

A collimating system 340 for condensing the white light output from the light conversion diffusion layer 325 to the liquid crystal panel 500 is disposed between the light conversion diffusion layer 325 and the liquid crystal panel 500. Therefore, as described above in greater detail with reference to FIG. 1, the liquid crystal panel 500 forms an image having a predetermined color using the white light emitted from the backlight unit 300.

Figure 4:
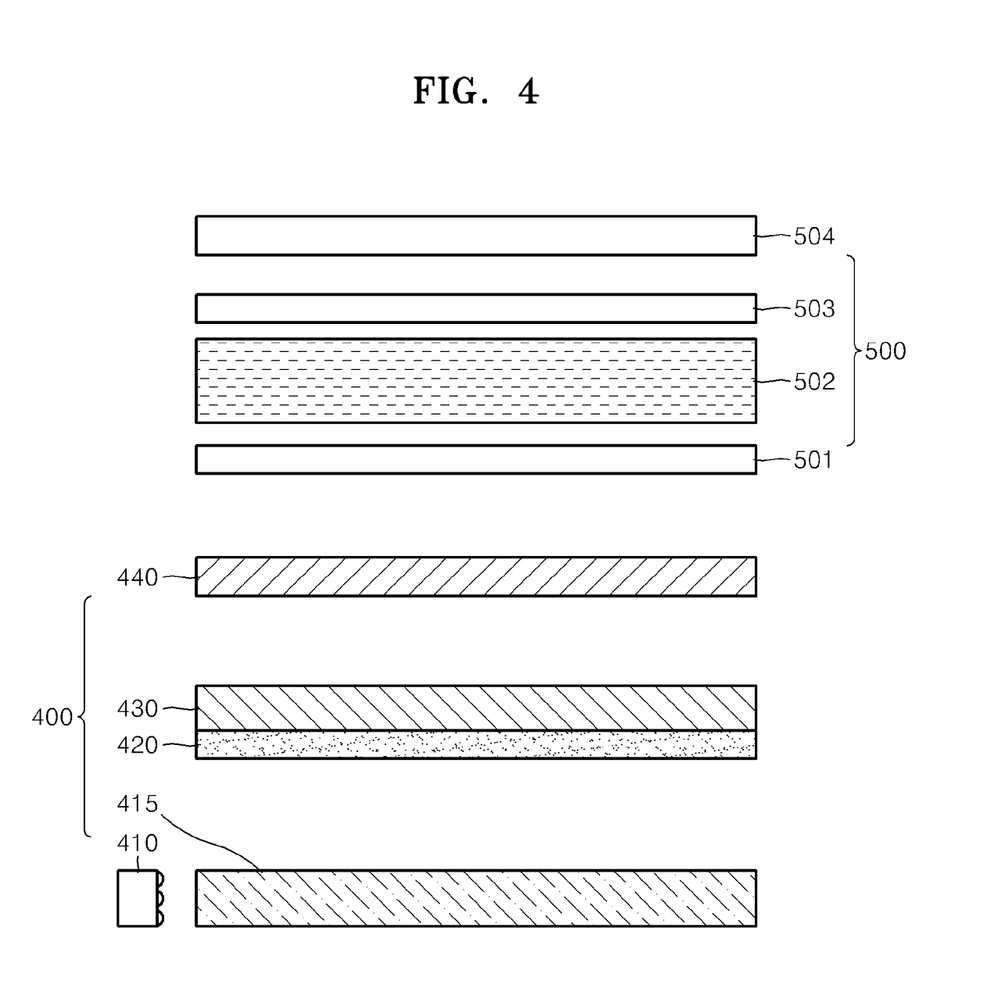
FIG. 4 is a partial cross-sectional view of an LCD device according to yet another alternative exemplary embodiment of the present invention.

FIG. 4 is a partial cross-sectional view of a backlight unit according to still another alternative exemplary embodiment of the present invention and an LCD device including the backlight unit. In FIG. 4, the same reference characters refer to the same or like components of an LCD device described herein with respect to the exemplary embodiments shown in FIGS. 1-3, and any repetitive detailed description thereof has been omitted. Thus, in the following description, only differences from the above-described exemplary embodiments will be described.

Referring to FIG. 4, a backlight unit 400 according to an exemplary embodiment of the present invention includes an LED light source 410 and a light conversion layer 420 disposed separate from the LED light source 410. In an exemplary embodiment, the LED light source 410 is disposed under and at a side of the light conversion layer 420, rather than directly under the light conversion layer 420 (as was the case in alternative exemplary embodiments described above with reference to FIGS. 1-3, for example). Thus, the LED light source 410 is disposed to the side of and under the light conversion layer 420, as shown in FIG. 4. In an exemplary embodiment, the LED light source 410 is an LED light source 410 which emits blue light or, alternatively, an LED light source 410 which emits an ultraviolet light.

A light guide panel 415 is provided in an optical path between the LED light source 410 and the light conversion layer 420. More specifically, light guide panel 415 is disposed under, e.g., directly under, the light conversion layer 420, as shown in FIG. 4. The light guide panel 415 guides light emitted from the LED light source 410, disposed at a side of the light guide panel 415, toward the light conversion layer 420. Accordingly, the light emitted from the LED light source 410 passes through the light guide panel 415 and is thereafter incident on the light conversion layer 420. The light incident on the light conversion layer 420 is changed to white light as it passes through the light conversion layer 420.

In an exemplary embodiment of the present invention, the light conversion layer 420 is formed of a semiconductor nano crystal, as described in greater detail above. The light conversion layer 420 according to an alternative exemplary embodiment can be formed to include a plurality of layers. In this case, the plurality of layers may have a variety of arrangement structures as described above. Also, when the light conversion layer 420 has a plurality of layers, the layers may be separated a predetermined distance from one another and a blank layer may be arranged therebetween.

A diffusion panel 430 is disposed between the light conversion layer 420 and the liquid crystal panel 500. The diffusion panel 430 diffuses and emits the white light output from the light conversion layer 420 to substantially improve a uniformity of the white light. In the exemplary embodiment of the present invention shown in FIG. 4, the light conversion layer 420 contacts the diffusion panel 430, e.g., is disposed directly on the diffusion panel 430, but alternative exemplary embodiments of the present invention are not limited thereto. In an alternative exemplary embodiment, for example, the light conversion layer 420 may be disposed separate from the diffusion panel 430, e.g., not directly on the diffusion panel 430.

The light conversion layer 420 may be manufactured by coating the semiconductor nano crystal onto a transparent substrate or, alternatively, in a film type material in which the semiconductor nano crystal is distributed in a transparent composite, as described in greater detail above. Alternatively, the light conversion layer 420 may be manufactured by coating the semiconductor nano crystal onto the diffusion panel 430.

In an exemplary embodiment of the present invention, a collimating system 440 is disposed between the diffusion panel 430 and the liquid crystal panel 500. The collimating system 140 condenses the white light output from the diffusion panel 130 toward the liquid crystal panel 500. Thereafter, the liquid crystal panel 500 forms an image having a predetermined color using the white light emitted from the backlight unit 400, as described in greater detail above.

In the exemplary embodiment illustrated in FIG. 4, the diffusion panel 430 is shown as being disposed between the light conversion layer 420 and the liquid crystal panel 500, but alternative exemplary embodiments are not limited thereto. For example, the diffusion panel 430 may be disposed between the LED light source 410 and the light conversion layer 420, as described in greater detail above with reference to FIG. 2. Also, in an alternative exemplary embodiment, a light conversion diffusion layer 325 (FIG. 3) may be provided instead of the light conversion layer 410 and the diffusion panel 430. Further, the light conversion diffusion layer 325 may be manufactured by distributing the semiconductor nano crystal in a transparent composite including a light diffusion material. In this case, the light emitted from the LED light source 410 is incident on the light conversion diffusion layer 235 via the light guide panel 415. Thus, the light incident on the light conversion diffusion layer is diffused and changed to white light while passing through the light conversion diffusion layer, and is thereafter emitted to the liquid crystal panel 500 to form the image having the predetermined color using the white light emitted from the backlight unit 400.

According exemplary embodiments of the present invention as described herein, color reproducibility and color purity of a backlight unit are substantially improved, since a light conversion layer is formed of a semiconductor nano crystal. Since the light conversion layer or, alternatively, a light conversion diffusion layer, is disposed separate from an LED light source, operating characteristics of the light conversion layer (or of light conversion diffusion layer) are not degraded due to heat generated from LED chips, for example. Also, the light conversion layer formed of the semiconductor nano crystal may be manufactured as a separate film type material, and a manufacturing process of the backlight unit is thereby substantially simplified.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A backlight unit for a liquid crystal display device including a liquid crystal panel, the backlight unit comprising:
   a light emitting diode light source comprising a substrate and at least two light emitting diode; and
   a light conversion layer disposed spaced apart from the light emitting diode light source by a predetermined distance between the liquid crystal panel and the light emitting diode light source, wherein
   the light conversion layer comprises a semiconductor nano crystal, and
   the light conversion layer converts light emitted from the light emitting diode light source to white light and provides the white light to the liquid crystal panel.

2. The backlight unit of claim 1, further comprising one of a diffusion panel disposed between the light conversion layer and the liquid crystal panel and a diffusion panel disposed between the light emitting diode light source and the light conversion layer.

3. The backlight unit of claim 1, wherein
the light conversion layer further comprises a transparent substrate, and
the semiconductor nano crystal is disposed directly on the transparent substrate at a uniform thickness.

4. The backlight unit of claim 1, wherein
the light conversion layer further comprises a film type material including a transparent composite, and
the semiconductor nano crystal is distributed in the film type material.

5. The backlight unit of claim 2, wherein the semiconductor nano crystal of the light conversion layer is disposed directly on the diffusion panel at a uniform thickness.

6. The backlight unit of claim 1, wherein the light conversion layer comprises a plurality of layers.

7. The backlight unit of claim 6, wherein the plurality of layers are disposed such that a layer has a light emission wavelength having a lower energy as the layer is located closer to the LED light source.

8. The backlight unit of claim 6, wherein the plurality of layers are separated from one another and a blank layer is formed therebetween.

9. The backlight unit of claim 1, wherein the light emitting diode light source is disposed at a side of the light conversion layer.

10. The backlight unit of claim 9, further comprising a light guide panel disposed between the light emitting diode light source and the light conversion layer, wherein the light guide panel guides the light emitted from the light emitting diode light source to the light conversion layer.

11. The backlight unit of claim 1, wherein the light emitting diode light source emits one of a blue light and an ultraviolet light.

12. The liquid crystal display device of claim 1, wherein the light conversion layer covers the at least two light emitting diodes.

13. The liquid crystal display device of claim 1, wherein the light conversion layer receives a light emitted from the at least two light emitting diodes.

14. A liquid crystal display device comprising:
a light emitting diode light source comprising a substrate and at least two light emitting diode;
a light conversion layer disposed spaced apart from and above the light emitting diode light source by a predetermined distance; and
a liquid crystal panel disposed above the light conversion layer, wherein
the light conversion layer comprises a semiconductor nano crystal,
the light conversion layer converts light emitted from the light emitting diode light source to white light, and
the liquid crystal panel forms an image using the white light.

15. The liquid crystal display device of claim 14, further comprising one of a diffusion panel disposed between the light conversion layer and the liquid crystal panel and a diffusion panel disposed between the light emitting diode light source and the light conversion layer.

16. The liquid crystal display device of claim 14, wherein the light emitting diode light source is disposed at a peripheral side of the light conversion layer.

17. The liquid crystal display device of claim 14, wherein the light emitting diode light source emits one of a blue light and an ultraviolet light.

18. The liquid crystal display device of claim 14, wherein the liquid crystal panel comprises:
a liquid crystal layer; and
a color filter disposed adjacent to the liquid crystal layer, wherein the color filter receives the white light and forms an image having a predetermined color using the white light.

19. A backlight unit for a liquid crystal display device including a liquid crystal panel, the backlight unit comprising:
a light emitting diode light source comprising a substrate and at least two light emitting diode; and
a light conversion diffusion layer disposed separate from the light emitting diode light source between the liquid crystal panel and the light emitting diode light source, wherein
the light conversion diffusion layer comprises a semiconductor nano crystal, and
the light conversion diffusion layer converts light emitted from the light emitting diode light source to white light and provides the white light to the liquid crystal panel.

20. The backlight unit of claim 19, wherein
the light conversion diffusion layer further comprises a film type material including a transparent composite and a light diffusion material, and
the semiconductor nano crystal is distributed in the film type material.

21. The backlight unit of claim 19, wherein the light emitting diode light source is disposed at a peripheral side of the light conversion diffusion layer.

22. The backlight unit of claim 21, further comprising a light guide panel disposed between the light emitting diode light source and the light conversion diffusion layer, wherein the light guide panel guides the light emitted from the light emitting diode light source to the light conversion diffusion layer.

23. The backlight unit of claim 19, wherein the light conversion diffusion layer comprises a plurality of layers.

24. The backlight unit of claim 23, wherein the plurality of layers are disposed such that a layer has a light emission wavelength having a lower energy as the layer is located closer to the LED light source.

25. The backlight unit of claim 23, wherein the plurality of layers are separated from one another and a blank layer is formed therebetween.

26. A liquid crystal display device comprising:
a light emitting diode light source comprising a substrate and at least two light emitting diode;
a light conversion diffusion layer disposed separate from and above the light emitting diode light source; and
a liquid crystal panel disposed above the light conversion diffusion layer, wherein
the light conversion diffusion layer comprises a semiconductor nano crystal,
the light conversion diffusion layer converts light emitted from the light emitting diode light source to white light, and
the liquid crystal panel forms an image using the white light.

27. The liquid crystal display device of claim 26, wherein the light emitting diode light source is disposed at a peripheral side of the light conversion diffusion layer.

28. The liquid crystal display device of claim 26, wherein the light emitting diode light source emits one of a blue light and an ultraviolet light.

* * * * *